US010547580B2

(12) United States Patent
Roth et al.

(10) Patent No.: US 10,547,580 B2
(45) Date of Patent: Jan. 28, 2020

(54) DYNAMICALLY RE-PARENTING EMAIL MESSAGES BASED ON UPDATED CONVERSATIONS

(71) Applicant: Microsoft Technology Licensing, LLC, Redmond, WA (US)

(72) Inventors: Tali Roth, Kirkland, WA (US); Andrew G. Carlson, Redmond, WA (US); Justin B. Mahood, Seattle, WA (US); Brian T. Hill, Highland, UT (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 37 days.

(21) Appl. No.: 15/286,102

(22) Filed: Oct. 5, 2016

(65) Prior Publication Data

US 2018/0097760 A1 Apr. 5, 2018

(51) Int. Cl.
*H04L 12/58* (2006.01)

(52) U.S. Cl.
CPC ............ *H04L 51/16* (2013.01); *H04L 51/22* (2013.01)

(58) Field of Classification Search
None
See application file for complete search history.

(56) References Cited

U.S. PATENT DOCUMENTS

| 7,103,634 | B1 | 9/2006 | Ullmann et al. |
| 7,222,299 | B1 | 5/2007 | Lim et al. |
| 7,395,315 | B2 | 7/2008 | Colson et al. |
| 7,506,263 | B1 | 3/2009 | Johnston et al. |
| 7,921,176 | B2 | 4/2011 | Madnani |
| 8,185,482 | B2 | 5/2012 | Yang et al. |
| 8,332,477 | B1 | 12/2012 | Kaiserlian et al. |
| 8,645,430 | B2 | 2/2014 | Khouri et al. |
| 8,780,703 | B1 | 7/2014 | Eidelson et al. |
| 9,043,411 | B2 | 5/2015 | Claux et al. |
| 2004/0202117 | A1 | 10/2004 | Wilson et al. |
| 2004/0260756 | A1 | 12/2004 | Forstall et al. |
| 2005/0108402 | A1 | 5/2005 | Colson et al. |
| 2006/0271630 | A1 | 11/2006 | Bensky et al. |
| 2007/0282956 | A1 | 12/2007 | Staats |
| 2009/0044200 | A1 | 2/2009 | Bordia et al. |
| 2009/0176521 | A1 | 7/2009 | Klassen et al. |
| 2009/0239504 | A1* | 9/2009 | Turk ................. H04L 51/18 455/412.1 |

(Continued)

FOREIGN PATENT DOCUMENTS

| CN | 101090409 A | 12/2007 |
| CN | 102273234 A | 12/2011 |
| WO | 2006083820 A2 | 8/2006 |

OTHER PUBLICATIONS

Horowitz, Paul, "Get Notifications for Specific Email Threads in iOS Mail App", Published on: Nov. 13, 2014 Available at: http://osxdaily.com/2014/11/13/enable-notifications-email-thread-ios-mail/.

(Continued)

*Primary Examiner* — Younes Naji
(74) *Attorney, Agent, or Firm* — Christopher J. Volkmann; Kelly, Holt & Christenson, PLLC (57) ABSTRACT

When a user is responding to a message in a thread and a new response message is detected for the thread, the user's response is automatically re-parented so the user's response is sent as a response to the newly detected response message in the thread.

18 Claims, 10 Drawing Sheets

(56) References Cited

U.S. PATENT DOCUMENTS

| | | | |
|---|---|---|---|
| 2009/0254624 A1 | 10/2009 | Baudin et al. | |
| 2010/0167766 A1 | 7/2010 | Duarte et al. | |
| 2010/0293475 A1 | 11/2010 | Nottingham et al. | |
| 2011/0191429 A1 | 8/2011 | Tu et al. | |
| 2011/0196933 A1 | 8/2011 | Jackson et al. | |
| 2011/0263278 A1 | 10/2011 | Riddle et al. | |
| 2012/0036197 A1 | 2/2012 | Bishop | |
| 2012/0124146 A1 | 5/2012 | Hsiao et al. | |
| 2012/0124147 A1 | 5/2012 | Hamlin et al. | |
| 2012/0124483 A1 | 5/2012 | Zuckerberg et al. | |
| 2012/0198017 A1 | 8/2012 | LeVasseur et al. | |
| 2012/0221638 A1 | 8/2012 | Edamadaka et al. | |
| 2012/0311055 A1* | 12/2012 | Adams | H04M 1/72552 709/206 |
| 2013/0024780 A1 | 1/2013 | Sutedja et al. | |
| 2013/0091227 A1 | 4/2013 | Bhakar et al. | |
| 2013/0124548 A1 | 5/2013 | Chhaparia et al. | |
| 2013/0124643 A1 | 5/2013 | DeLuca et al. | |
| 2013/0290435 A1 | 10/2013 | Martin et al. | |
| 2013/0290436 A1 | 10/2013 | Martin et al. | |
| 2014/0245178 A1 | 8/2014 | Smith | |
| 2014/0304505 A1* | 10/2014 | Dawson | G06F 21/6227 713/165 |
| 2015/0113076 A1 | 4/2015 | Dubie et al. | |
| 2015/0127749 A1 | 5/2015 | Mishanski | |
| 2015/0207768 A1* | 7/2015 | Mahood | H04L 51/16 709/206 |
| 2015/0263995 A1 | 9/2015 | Mahood et al. | |
| 2015/0281143 A1 | 10/2015 | Wang | |
| 2015/0281165 A1 | 10/2015 | Chao | |
| 2016/0021033 A1 | 1/2016 | Peterson et al. | |
| 2017/0034084 A1* | 2/2017 | Brunsen | H04L 51/16 |

OTHER PUBLICATIONS

U.S. Appl. No. 14/162,125, filed Jan. 23, 2014 Application, Drawings, Office Action dated Jun. 5, 2016, Amendment dated Jun. 9, 2016. 62 pages.

Wang, et al., "Email Conversations Reconstruction Based on Messages Threading for Multiperson", In International Workshop on Education Technology and Training, and International Workshop on Geoscience and Remote Sensing, vol. 1, Dec. 21, 2008, 5 pages.

International Search Report and Written Opinion for International Application No. PCT/US2015/012326, dated Apr. 21, 2015, date of filing: Jan. 22, 2015, 9 pages.

Second Written Opinion for International Patent Application No. PCT/US2015/019549, dated Feb. 25, 2016, date of filing: Mar. 10, 2015, 6 pages.

International Preliminary Report on Patentability for International Patent Application No. PCT/US2015/019549, dated Apr. 1, 2016, date of filing: Mar. 10, 2015, 12 pages.

International Search Report and Written Opinion for International Application No. PCT/US2015/019549, dated Jun. 16, 2015, date of filing: Mar. 10, 2015, 10 pages.

Wang, et al., "Recovering Implicit Thread Structure in Newsgroup Style Conversations", In Proceedings of the Second International Conference on Weblogs and Social Media, Mar. 30, 2008, 9 pages.

Joshi, et al., "Auto-Grouping Emails for Faster E-Discovery", In Proceedings of VLDB Endowment, vol. 4, Issue 12, Aug. 29, 2011, 11 pages.

Prosecution History for U.S. Appl. No. 14/209,604 including: Response to Notice to File Missing Parts dated Apr. 10, 2014, Notice to File Missing Parts dated Apr. 4, 2014, Application and Drawings filed Mar. 13, 2014, 61 pages.

International Preliminary Report on Patentability for International Application No. PCT/US2015/012326, dated Oct. 23, 2015, date of filing: Jan. 22, 2015, 19 pages.

International Preliminary Report on Patentability for International Application No. PCT/US2015/012326 dated Nov. 6, 2015, 13 pages.

"International Search Report and Written Opinion Issued in PCT Application No. PCT/US2017/054648", dated Jan. 9, 2018, 12 Pages.

"Non Final Office Action Issued in U.S. Appl. No. 14/162,125", dated Apr. 13, 2018, 26 Pages.

"Non Final Office Action Issued in U.S. Appl. No. 14/209,604", dated Jun. 1, 2018, 28 Pages.

"Office Action Issued in European Patent Application No. 15704135.1", dated Jul. 27, 2017, 3 Pages.

Prosecution History for U.S. Appl. No. 14/209,604 including: Amendment with RCE dated Nov. 15, 2017, Final Office Action dated Aug. 17, 2017, Amendment dated Apr. 27, 2017, and Non-Final Office Action dated Dec. 30, 2016, 78 pages.

Prosecution History for U.S. Appl. No. 14/162,125 including: RCE filed Jan. 3, 2018, Advisory Action dated Dec. 26, 2017, Amendment After Final dated Dec. 14, 2017, Final Office Action dated Oct. 27, 2017, Amendment dated Aug. 4, 2017, Non-Final Office Action dated May 4, 2017, Amendment with RCE dated Feb. 14, 2017, Final Office Action dated Nov. 23, 2016, Amendment dated Sep. 6, 2016, and Non-Final Office Action dated May 6, 2016, 152 pages.

"Final Office Acton Issued in U.S. Appl. No. 14/162,125", dated Sep. 19, 2018, 28 Pages.

"First Office Action and Search Report Issued in Chinese Patent Application No. 201580008932.3", dated Aug. 30, 2018, 10 Pages.

"Non Final Office Action Issued in U.S. Appl. No. 14/209,604", dated May 31, 2019, 45 Pages.

"Final Office Action Issued in U.S. Appl. No. 14/209,604", dated Jan. 18, 2019, 45 Pages.

* cited by examiner

DYNAMICALLY RE-PARENTING EMAIL MESSAGES BASED ON UPDATED CONVERSATIONS

BACKGROUND

Computer systems are currently in wide use. Some computer systems include messaging systems by which users can send messages back and forth to one another.

There are a wide variety of different types of messaging systems. They can include, for instance, electronic mail (e-mail) messaging systems, text messaging systems, social network messaging systems, among others. In these types of messaging systems, it is common for a user to send a message to one or more recipients. The recipients can then reply to all of the other recipients, to a subset of those recipients, or add additional recipients. If multiple people reply to the same message, then if a user wishes to respond to each of the messages, the user normally needs to manually aggregate all of the related messages and respond individually to those messages. Also, if a user wants to act on the whole set of messages (for instance, to move the set to a folder) then the user would normally have to act on each individually.

Some systems have attempted to group messages into conversations. However, this normally entails simply grouping sets of messages together based upon their topic. A user who wishes to reply to forked messages in the conversation still normally needs to read and respond to each individual message.

The discussion above is merely provided for general background information and is not intended to be used as an aid in determining the scope of the claimed subject matter.

SUMMARY

When a user is responding to a message in a thread and a new response message is detected for the thread, the user's response is automatically re-parented so the user's response is sent as a response to the newly detected response message in the thread.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter. The claimed subject matter is not limited to implementations that solve any or all disadvantages noted in the background.

DETAILED DESCRIPTION

Figure 1:
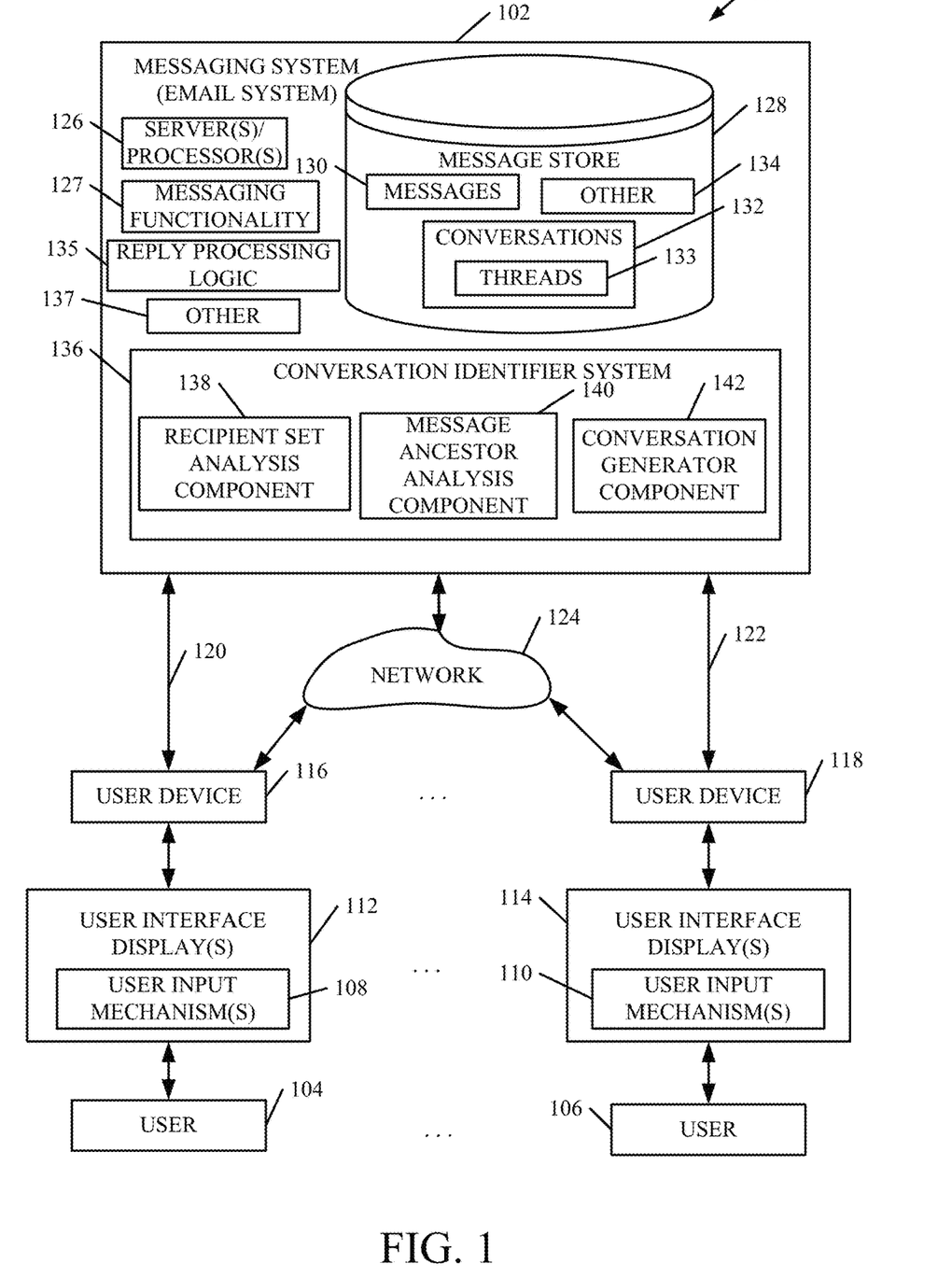
FIG. 1 is a block diagram of one illustrative messaging architecture.

FIG. 1 shows a block diagram of messaging architecture 100. While messaging architecture 100 can be a variety of different types of messaging systems it will be described as an e-mail system for the sake of example.

Also, as used herein, a conversation means a collection of messages that are related by ancestry: for instance, they are directly or indirectly derived-via Reply, Reply All, or Forward—from a common root message. A thread is a collection of messages related by ancestry that share the same set of participants or where the set of participants grows over time. Threads can be acted on as a unit. For instance, a thread can be moved, as a unit, to a folder, etc.

Messaging architecture 100 includes messaging system (email system) 102 that is accessed by users 104-106, each of whom illustratively interact with user input mechanisms 108-110 on user interface displays 112-114 that are generated by user devices 116-118. Users 104 and 106 can interact with the user input mechanisms 108 and 110 to generate electronic mail messages, and replies, and send them to one another using messaging system 102. They can also act on messages in other ways as well, such as by placing them in a folder, or in other ways. FIG. 1 also shows that user devices 116-118 can access messaging system 102 either directly (as indicated by arrows 120 and 122), or over network 124. It will also be appreciated that messaging system 102 can be used by many other users as well, but only two users 104-106 are shown for the sake of example.

FIG. 1 further shows that messaging system 102 illustratively includes processor(s) (or server(s)) 126, messaging functionality 127, message store 128, (which, itself, stores messages 130, conversations 132, threads 133 within conversation 132, and can store other information 134 as well). Messaging system 102 also illustratively includes reply processing logic 135, conversation/thread identifier system 136, and it can include other items 137. System 136 can be any of a variety of different systems that group messages into conversations and threads. In one example, system 136 illustratively includes recipient set analysis component 138, message ancestor analysis component 140 and conversation/thread generator component 142. It can include other components or systems as well, and those shown in FIG. 1 are shown for the sake of example only.

Messaging functionality 127 is illustratively email functionality that allows a user to send, receive and reply to messages. It can allow many other functions, such as arranging folders, filters, adding attachments, etc.

Reply processing logic 135 illustratively detects when a user begins to respond to the most recent message in the thread 133. If, before the user has sent the response, a newer message is received in the same thread 133, then logic 135 automatically re-parents the user's response so it is sent in response to the new message. This is described in greater detail below.

Messages 130 illustratively include all messages that are sent by the users of messaging system 102. Conversations 132 illustratively include message identifiers that identify various messages 130 that belong to various different conversations, based on their message ancestry. Messages 130 can also belong to a thread 133 within conversation 132. For instance, conversation/thread identifier system 136 illustratively identifies atomic communication threads 133 based on a series of independently addressable messages between users 104 and 106 (and other users). The threads 133 (e.g., within conversations 132) are identified over a message response chain (which can be a collection of message identifiers that indicate relationships between independent messages), as well as a set of recipients for each of the messages.

Figure 2:
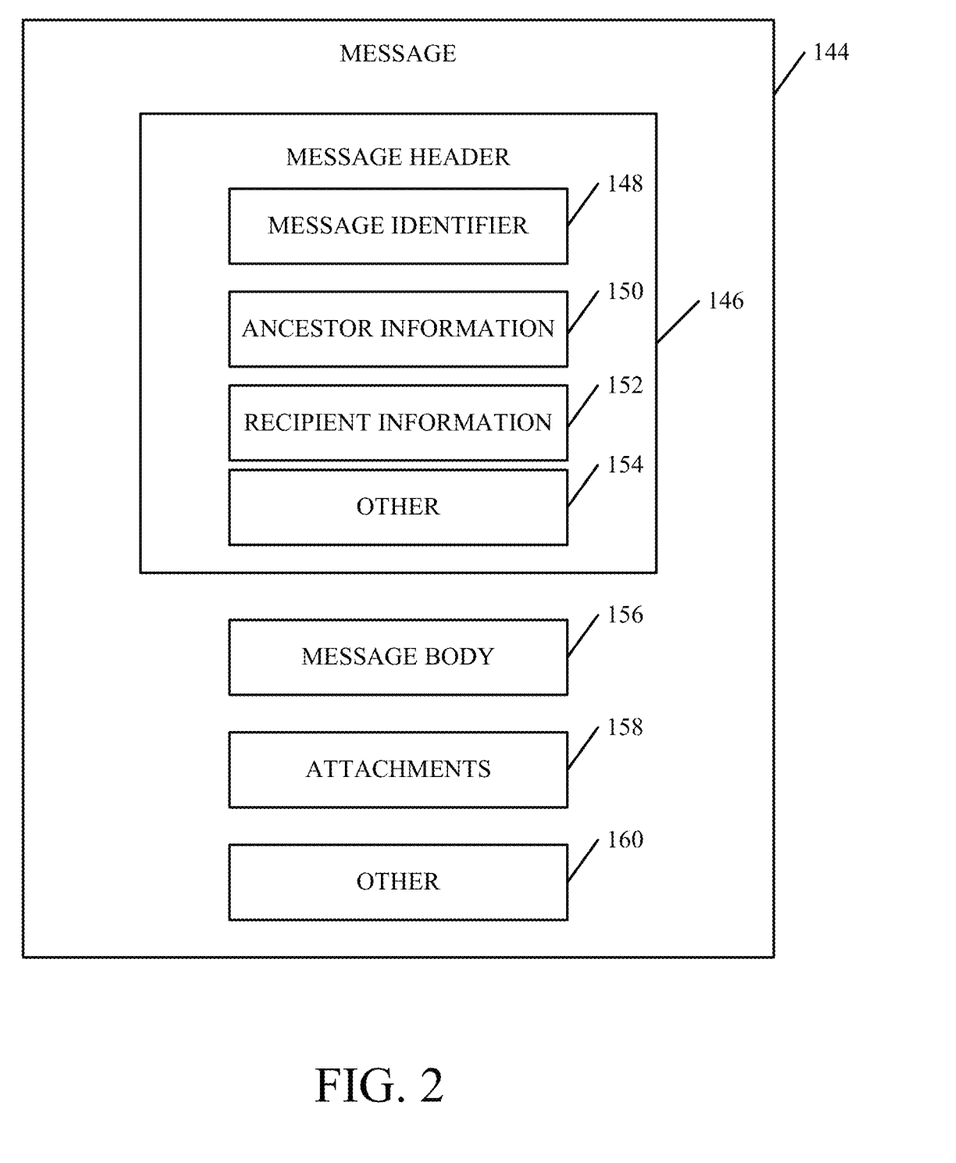
FIG. 2 is a block diagram of one illustrative message that can be sent in the architecture shown in FIG. 1.

FIG. 2 shows one illustrative block diagram of a message 144 that can be sent using messaging system 102. In the example shown in FIG. 2, message 144 illustratively includes header information 146 (which, itself, includes a unique message identifier 148 that uniquely identifies message 144), ancestor information 150 that identifies the ancestor messages to message 144, recipient information 152 that identifies the recipients of message 144, and it can include other information 154 as well. FIG. 2 also shows that message 144 illustratively includes a message body 156 and it can include attachments 158 and other information 160 as well. It will be noted that the messages 144 can include other information as well, such as information identifying that the message was sent on behalf of someone else (e.g., a delegation scenario). In that case, the message will include an identifier that identifies a Sender, as well as a From field, but the person in the Sender field is different than the person in the From field.

In one example, ancestor information 150 is information that includes the message identifier for any ancestor messages to message 144. By ancestor messages, it is meant messages that precede message 144 in an already existing conversation. For instance, if user 104 sends a first message to user 106, and user 106 replies to that message, then if message 144 represents the reply message, ancestor information 150 will identify the message, to which message 144 is a reply. Further, if a third message is sent that is in reply to message 144, then the ancestor information 150 for the third message will include not only the message identifier for message 144, but also the message identifier for the first message, (the message that message 144 was in reply to). Thus, ancestor information 150 illustratively identifies all messages that precede the present message, in an already-existing conversation.

Before describing the overall operation of messaging system 102 in generating new conversations and new threads and adding messages to existing threads in existing conversations and also re-parenting responses so they are in response to the most recently received message in a thread, a brief overview will be provided to enhance understanding. A thread within a conversation is illustratively identified as a collection of messages originating from a common ancestor, in which the set of recipients is the same or grows over time. For instance, when an individual message is received by messaging system 102, the message ancestor analysis component 140 illustratively looks for a parent of the newly received message (which will be a message that the newly received message is directly in reply to). This may be specified as part of the message header 146. If the parent exists, and the recipients of the newly received message are a superset of the recipients in the parent message, then the newly received message is added as part of an existing thread that includes the parent message. If the parent message is not found, or the new recipient set on the newly received message is not a superset of the previous recipients, then a new thread is created and the newly received message is added to the new thread.

Once a thread has been identified by system 136 (whether as described herein or in any other way) then reply processing logic 135 ensures that user responses are in response to the most recent message in the thread. This is described in more detail below with respect to FIGS. 4 and 5.

Figure 3:
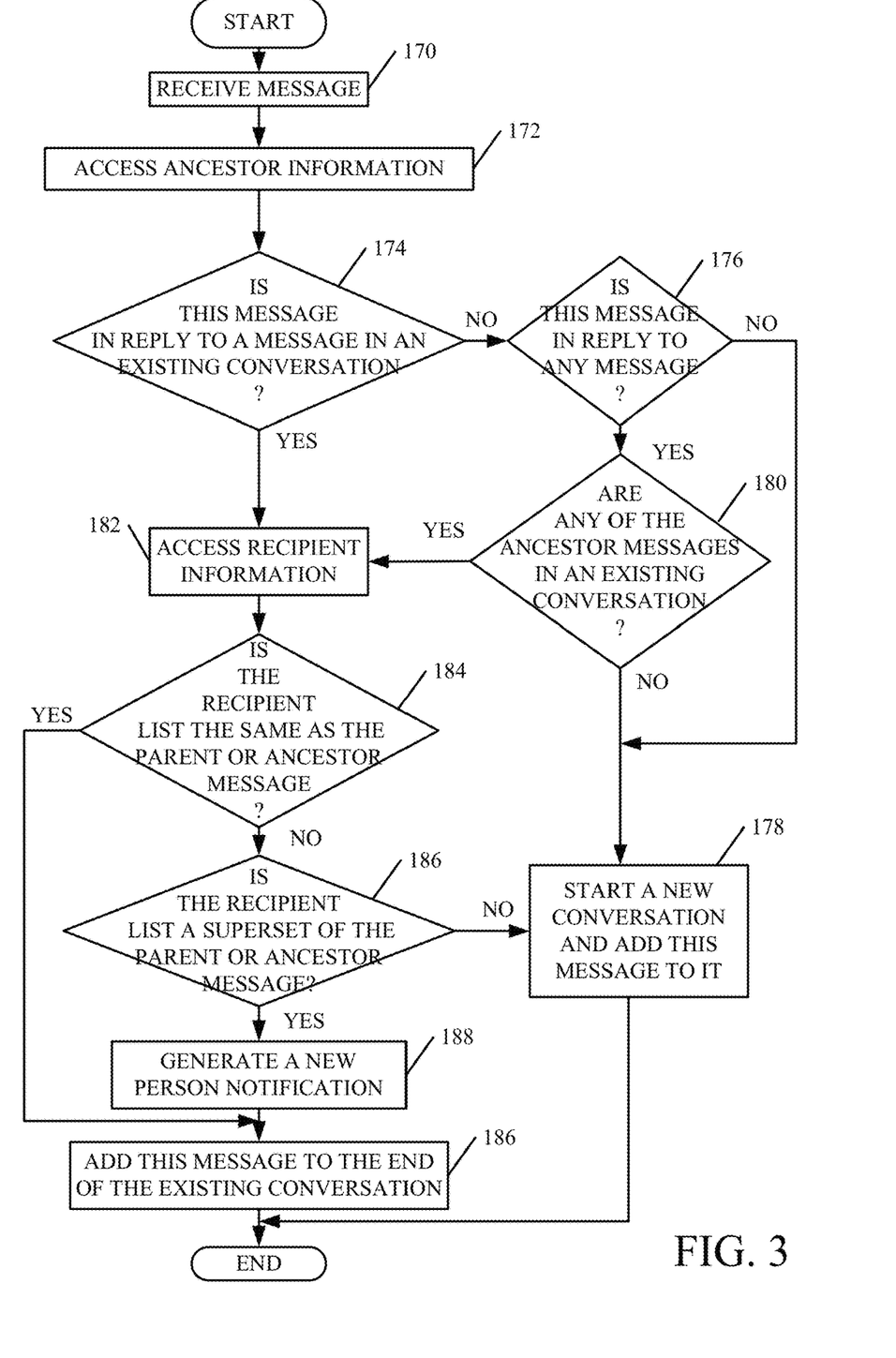
FIG. 3 is a flow diagram illustrating one example of the operation of the architecture shown in FIG. 1 in generating conversations and adding messages to those conversations.

FIG. 3 is a flow diagram illustrating one example of the operation of architecture 100 in generating new conversations and adding new messages to the new conversations and to threads in existing conversations, in more detail. Again, for purposes of the present discussion, threads can be identified in a variety of different ways and that described herein is described for the sake of example only. It is first assumed that one of users 104 and 106 generates a message and sends it through messaging system 102. Receiving the message at messaging system 102 is indicated by block 170 in FIG. 3.

Message ancestor analysis component 140 then accesses the ancestor information 150 in the newly received message. This is indicated by block 172. Message ancestor analysis component 140 determines whether the newly received message is in reply to a message in an already existing conversation 132. This is indicated by block 174 in FIG. 3. If not, component 140 determines whether the newly received message is in reply to any message at all. This is indicated by block 176. If the newly received message is not a reply message, then conversation generator component 142 starts a new conversation 132 and stores the newly received message as part of the new conversation in message store 128. This is indicated by block 178 in FIG. 3.

Returning again to block 176, if message ancestor analysis component 140 determines that the newly received message is, in fact, a reply message, then component 140 determines whether any of the ancestor messages identified in the newly received message are also identified as being part of an already existing conversation 132. This is indicated by block 180. If not, this may mean that the newly received message is an out-of-order delivery in an asynchronous messaging system (like email). If that occurs, then even though the newly received is a reply message, it is in reply to a message that is not part of any already-existing conversation. Therefore, again, conversation generator component 142 starts a new conversation and adds the newly received message to it, at block 178.

If, either at block 174 or 180, the parent message to the newly received message, or any of its ancestors, are in an already-existing conversation, then recipient set analysis component 138 accesses the recipient information 152 in the newly received message. This is indicated by block 182 in FIG. 3. If the recipient list in the newly received message is the same as either the parent or ancestor message (whichever was identified in block 174 or block 180, respectively), then the newly received message is simply added to the end of the thread in the already-existing conversation (which the parent message or ancestor message is a part of). This is indicated by blocks 184 and 186 in the flow diagram of FIG. 3.

However, if at block 184, component 138 determines that the recipient list of the newly received message is not the same as that of the parent or ancestor message, then component 138 determines whether the recipient list on the newly received message is a superset of the recipient list on the parent or ancestor message. This is indicated by block 187. If not, then conversation generator component 142 again generates a new thread in the conversation and adds the newly received message to the new thread.

However, if, at block 186, recipient set analysis component 138 determines that the recipient list on the newly received message is, in fact, a superset of the recipients on the parent or ancestor message, then the author of the newly received message has simply added a new recipient to the recipient list. A notification to that effect is added to the record for the newly received message. This is indicated by block 188. The newly received message is then added to the end of the thread in the existing conversation (which the parent or ancestor is a part of), as indicated by block 186.

Figure 4:
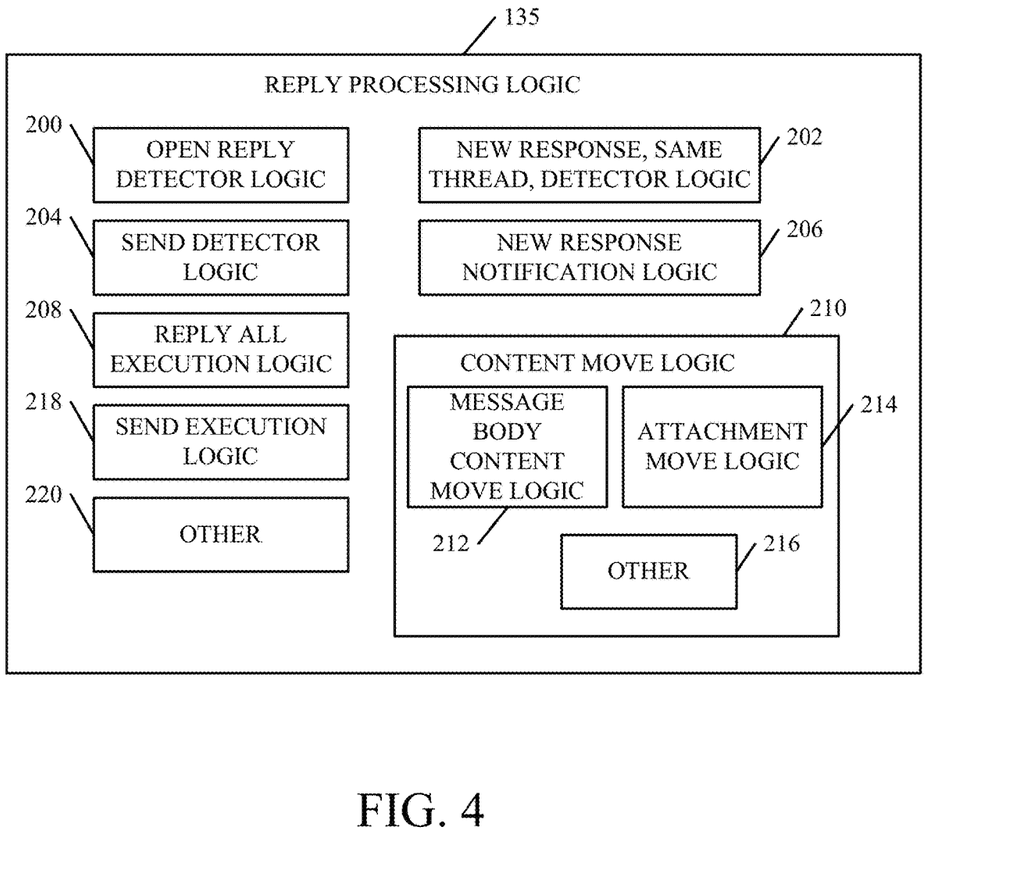
FIG. 4 is a block diagram showing one example of reply processing logic in more detail.

FIG. 4 is a block diagram showing one example of reply processing logic 135 in more detail. FIG. 4 shows that reply processing logic 135 can include open reply detector logic 200, new response, same thread detector logic 202, send detector logic 204, new response notification logic 206, reply all execution logic 208, content move logic 210 (which, itself, can include message body content move logic 212, attachment move logic 214, and other items 216), send execution logic 218, and it can include other items 220. Open reply detector logic 200 illustratively detects when a user opens a most recent message in a thread 133 and begins to respond (such as using a Reply All function) to the most recent message in the thread 133. New response, same thread detector logic 202 detects that the e-mail system 102 has now received a new message on the same thread 133 that the user is currently drafting a response to. New response notification logic 206 illustratively notifies the user that a new message has been received on the thread. In one example, the user can simply continue to complete drafting their response, by typing content into the message body, attaching attachments, inserting links, etc. The user may then illustratively actuate a Send actuator on the message user interface to send the user's reply. Then, reply all execution logic 208 automatically executes a Reply All function to automatically generate a Reply All message, replying to the most recently detected message in the thread 133. Content move logic 210 moves the user's content to the automatically generated Reply All message, and send execution logic 218 then executes a Send function so that the automatically generated reply is sent, in response to the most recently detected message in the thread 133. FIG. 5 is a flow diagram illustrating one example of this, in more detail.

Figure 5:
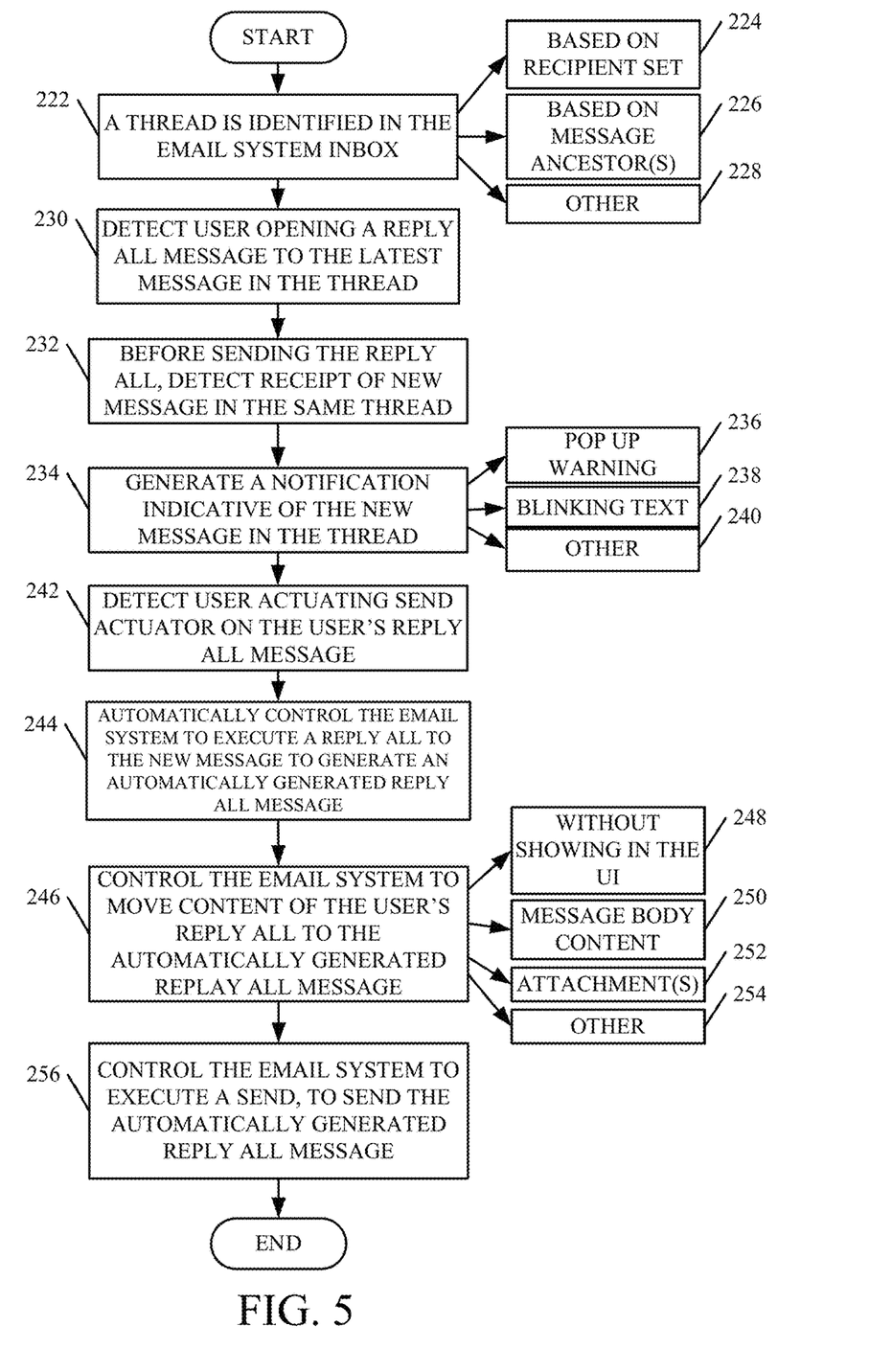
FIG. 5 shows a flow diagram illustrating one example of the operation of the reply processing logic.

FIG. 5 show a flow diagram illustrating one example of the operation of reply processing logic 135, in more detail. It is first assumed that conversation identifier system 136 has identified a conversation 132 and one or more threads 133 within that conversation. This is indicated by block 222 in the flow diagram of FIG. 5. As discussed above, the thread 133 can be identified based on a recipient set that identifies the recipients of the messages in the thread. This is indicated by block 224. It can be based on ancestor messages as indicated by block 226. The thread can be identified in other ways as well, and this is indicated by block 228.

At some point, a user will begin to respond to the most recent message in the thread 133. The user will illustratively do so by actuating a Reply All actuator to begin replying to all recipients identified on the thread, and by replying to the most recent message in the thread. Open reply detector logic 200 detects that the user has opened a Reply All message to the latest message in the thread 133, and this is indicated by block 230 in the flow diagram of FIG. 5.

Before the user sends the reply message, new response, same thread detector logic 202 detects that a new message has been received on the same thread 133 to which the user is replying. This is indicated by block 232 in the flow diagram of FIG. 5.

It will be noted that, in some current systems, when a user selects the most recent message in a conversation and chooses to reply to it, they may begin typing their draft reply message, but before they send it, other participants in the conversation may have also responded. It is then up to the user to copy his or her draft, choose the latest or newest message in the thread, and paste the content of his or her draft in a response to that newest message. Otherwise, the conversation forks.

In contrast, when this scenario is detected as at block 232 in FIG. 5, new response notification logic 206 generates a notification indicating that there is a new message in the thread to which the user is responding. This is indicated by block 234. This can be done in a wide variety of different ways, such as by showing a pop-up warning message 236, such as by displaying blinking text 238, or in a wide variety of other ways 240.

When send detector logic 204 detects that the user has actuated the Send actuator on the user's Reply All message, reply all execution logic 208 automatically controls the e-mail system to execute a Reply All to the newest message that was just recently detected in the same thread 133. Detecting the user's actuation of the Send actuator is indicated by block 242, and automatically controlling the e-mail system to execute a Reply All to the newest message is indicated by block 244.

Content move logic 210 then controls the e-mail system to move the content of the user's Reply All message to the automatically generated Reply All message. This is indicated by block 246 in the flow diagram of FIG. 5. This can be done without showing this in the user interface, so that the user may not even be aware that this is taking place. This is indicated by block 248.

In one example, message body content move logic 212 copies and pastes the message body content from the user's Reply All message to the automatically generated Reply All message. This is indicated by block 250. Attachment move logic 214 can also automatically move the attachments so that they are now attached to the automatically generated Reply All message. This is indicated by block 252. The content can be moved in other ways as well, and this is indicated by block 254.

Send execution logic 218 then controls the e-mail system 102 to execute a Send function. This sends the automatically generated Reply All message, in response to the newest message in the thread 133, to the recipients in the thread 133. This is indicated by block 256.

It can thus be seen that the present description not only keeps the conversation and thread updating live, while the user is typing his or her draft, but when the user sends his or her draft, the system ensures that the message is sent in reply to the most recently added message to the conversation or thread. The system thus keeps track of the unique text that the user has typed, and any attachments, and regenerates that text and attachments relative to a new message that is automatically generated, behind the scenes, and that is in reply to the most recent message in the thread. It will be noted that, in one example, by the term "automatically" it is meant that the steps are performed without any additional user involvement, other than, perhaps, to initiate, or allow those steps to be performed.

The present discussion has mentioned processors and/or servers. In one embodiment, the processors and servers include computer processors with associated memory and timing circuitry, not separately shown. They are functional parts of the systems or devices to which they belong and are activated by, and facilitate the functionality of, the other components or items in those systems.

Also, a number of user interface displays have been discussed. They can take a wide variety of different forms and can have a wide variety of different user actuatable input mechanisms disposed thereon. For instance, the user actuatable input mechanisms can be text boxes, check boxes, icons, links, drop-down menus, search boxes, etc. They can also be actuated in a wide variety of different ways. For instance, they can be actuated using a point and click device (such as a track ball or mouse). They can be actuated using hardware buttons, switches, a joystick or keyboard, thumb switches or thumb pads, etc. They can also be actuated using a virtual keyboard or other virtual actuators. In addition, where the screen on which they are displayed is a touch sensitive screen, they can be actuated using touch gestures. Also, where the device that displays them has speech recognition components, they can be actuated using speech commands.

A number of data stores have also been discussed. It will be noted they can each be broken into multiple data stores. All can be local to the systems accessing them, all can be remote, or some can be local while others are remote. All of these configurations are contemplated herein.

Also, the figures show a number of blocks with functionality ascribed to each block. It will be noted that fewer blocks can be used so the functionality is performed by fewer components. Also, more blocks can be used with the functionality distributed among more components.

Figure 6:
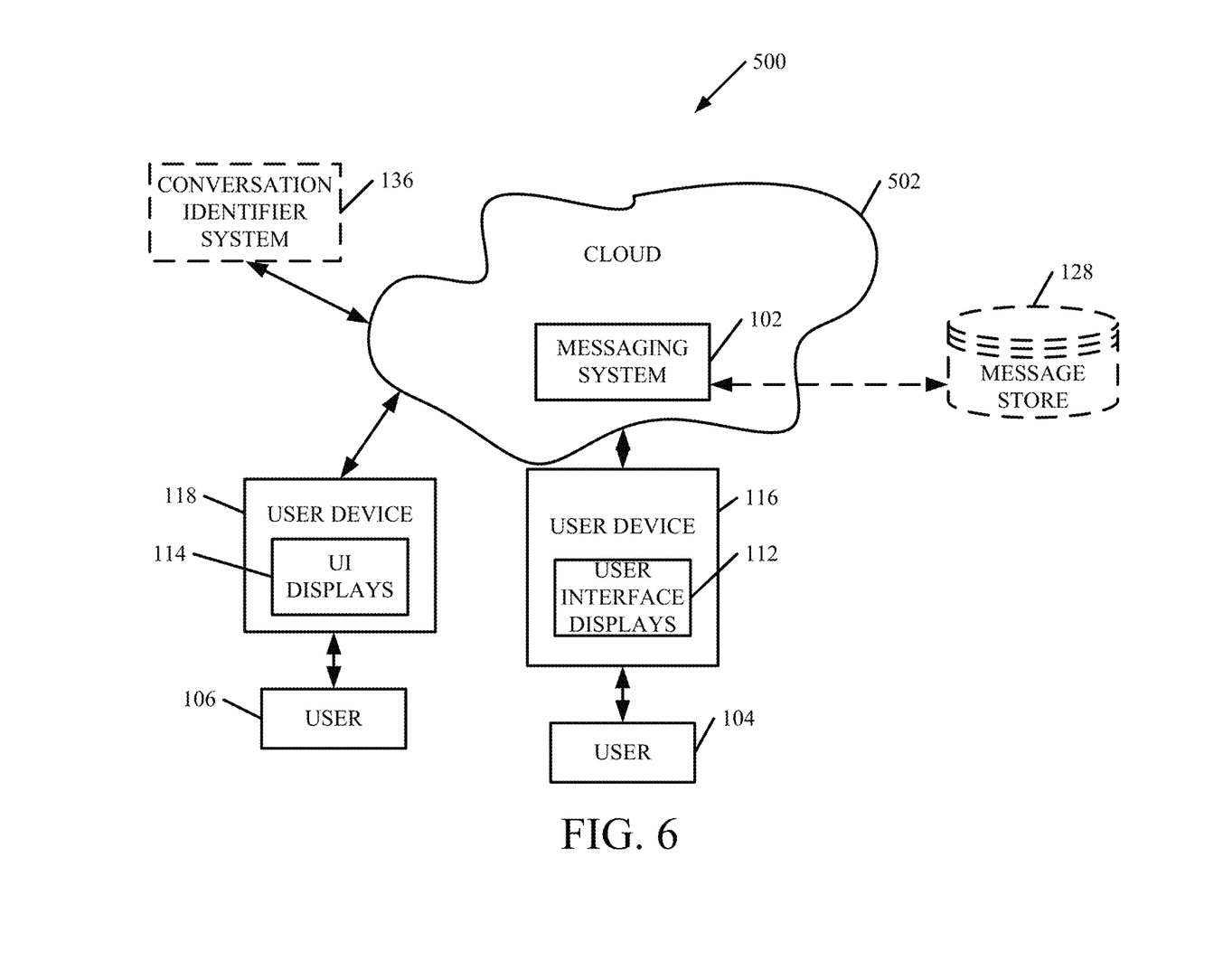
FIG. 6 shows one example of the architecture shown in FIG. 1, deployed in a cloud computing architecture.

FIG. 6 is a block diagram of architecture 100, shown in FIG. 1, except that its elements are disposed in a cloud computing architecture 500. Cloud computing provides computation, software, data access, and storage services that do not require end-user knowledge of the physical location or configuration of the system that delivers the services. In various embodiments, cloud computing delivers the services over a wide area network, such as the internet, using appropriate protocols. For instance, cloud computing providers deliver applications over a wide area network and they can be accessed through a web browser or any other computing component. Software or components of architecture 100 as well as the corresponding data, can be stored on servers at a remote location. The computing resources in a cloud computing environment can be consolidated at a remote data center location or they can be dispersed. Cloud computing infrastructures can deliver services through shared data centers, even though they appear as a single point of access for the user. Thus, the components and functions described herein can be provided from a service provider at a remote location using a cloud computing architecture. Alternatively, they can be provided from a conventional server, or they can be installed on client devices directly, or in other ways.

The description is intended to include both public cloud computing and private cloud computing. Cloud computing (both public and private) provides substantially seamless pooling of resources, as well as a reduced need to manage and configure underlying hardware infrastructure.

A public cloud is managed by a vendor and typically supports multiple consumers using the same infrastructure. Also, a public cloud, as opposed to a private cloud, can free up the end users from managing the hardware. A private cloud may be managed by the organization itself and the infrastructure is typically not shared with other organizations. The organization still maintains the hardware to some extent, such as installations and repairs, etc.

In the example shown in FIG. 6, some items are similar to those shown in FIG. 1 and they are similarly numbered. FIG. 6 specifically shows that messaging system 102 can be located in cloud 502 (which can be public, private, or a combination where portions are public while others are private). Therefore, users 104-106 use user devices 116-118 to access messaging system 102 through cloud 502.

FIG. 6 also depicts another example of a cloud architecture. FIG. 5 shows that it is also contemplated that some elements of system 102 can be disposed in cloud 502 while others are not. By way of example, data store 128 can be disposed outside of cloud 502, and accessed through cloud 502. In another example, conversation identifier system 136 can be also outside of cloud 502. Regardless of where they are located, they can be accessed directly by devices 116-118, through a network (either a wide area network or a local area network), they can be hosted at a remote site by a service, or they can be provided as a service through a cloud or accessed by a connection service that resides in the cloud. All of these architectures are contemplated herein.

It will also be noted that architecture 100, or portions of it, can be disposed on a wide variety of different devices. Some of those devices include servers, desktop computers, laptop computers, tablet computers, or other mobile devices, such as palm top computers, cell phones, smart phones, multimedia players, personal digital assistants, etc.

Figure 7:
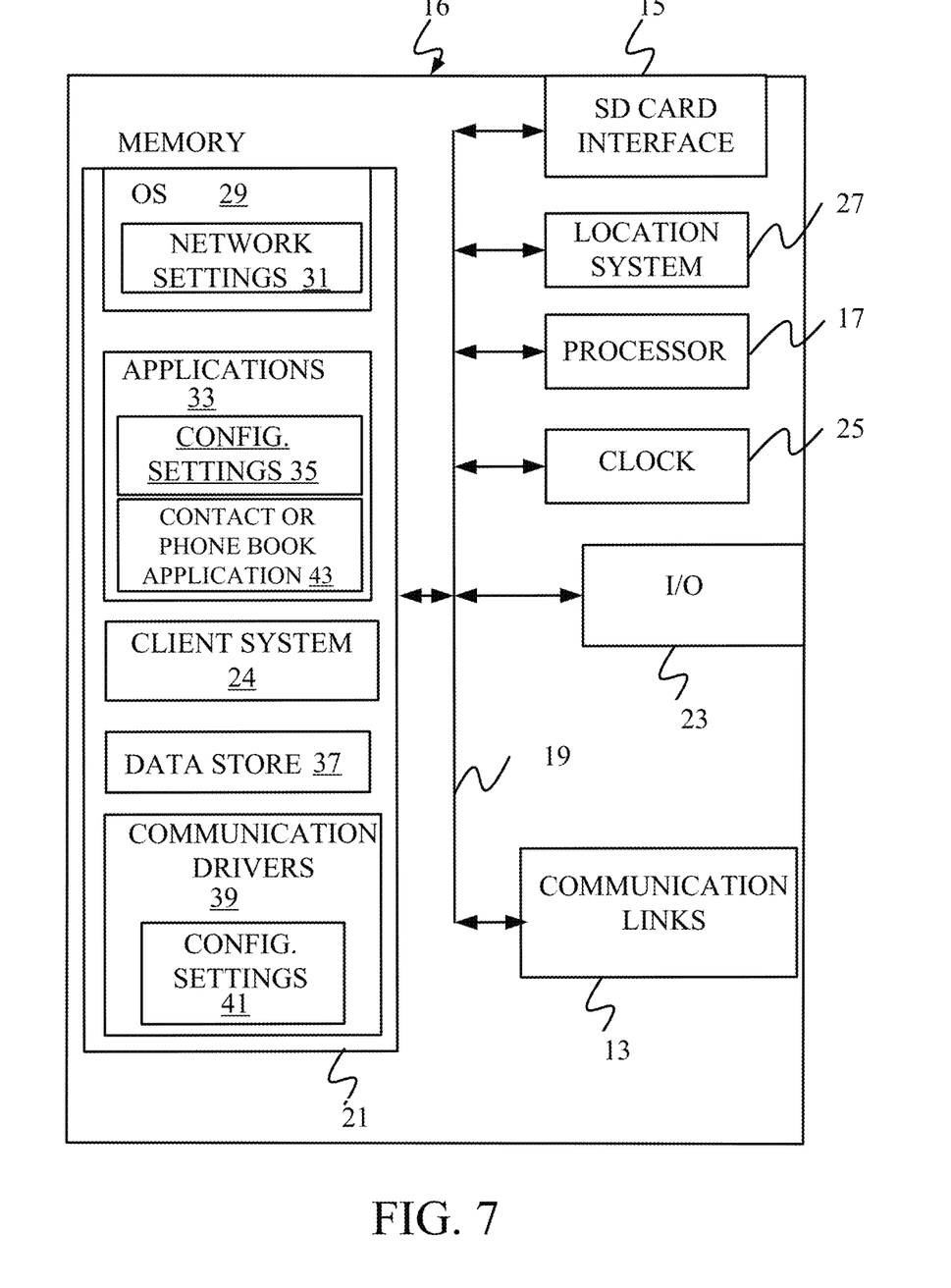
FIGS. 7-9 illustrate various examples of mobile devices that can be used by users in the architecture shown in FIGS. 1 and 6.
Figure 8:
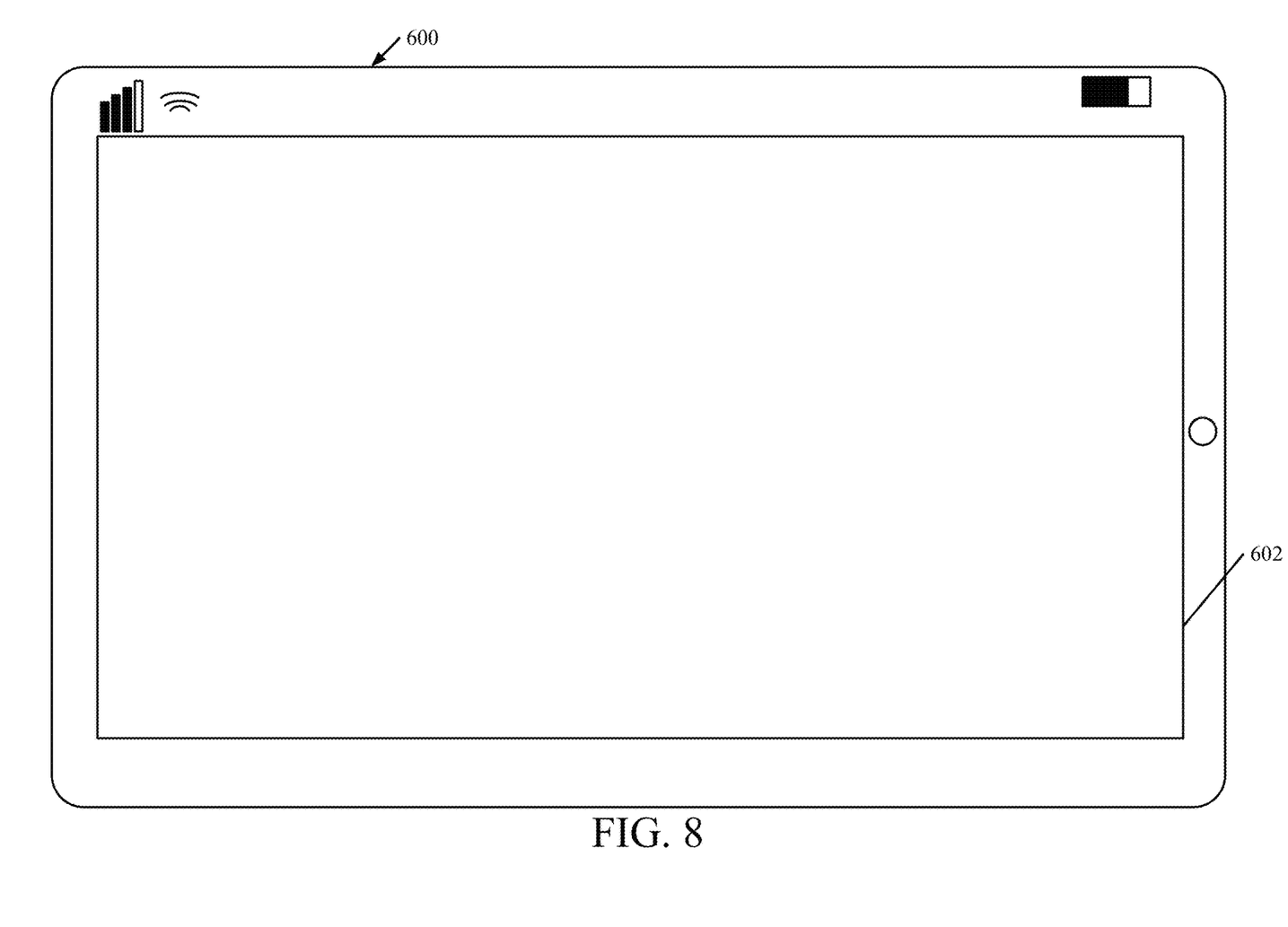
Figure 9:
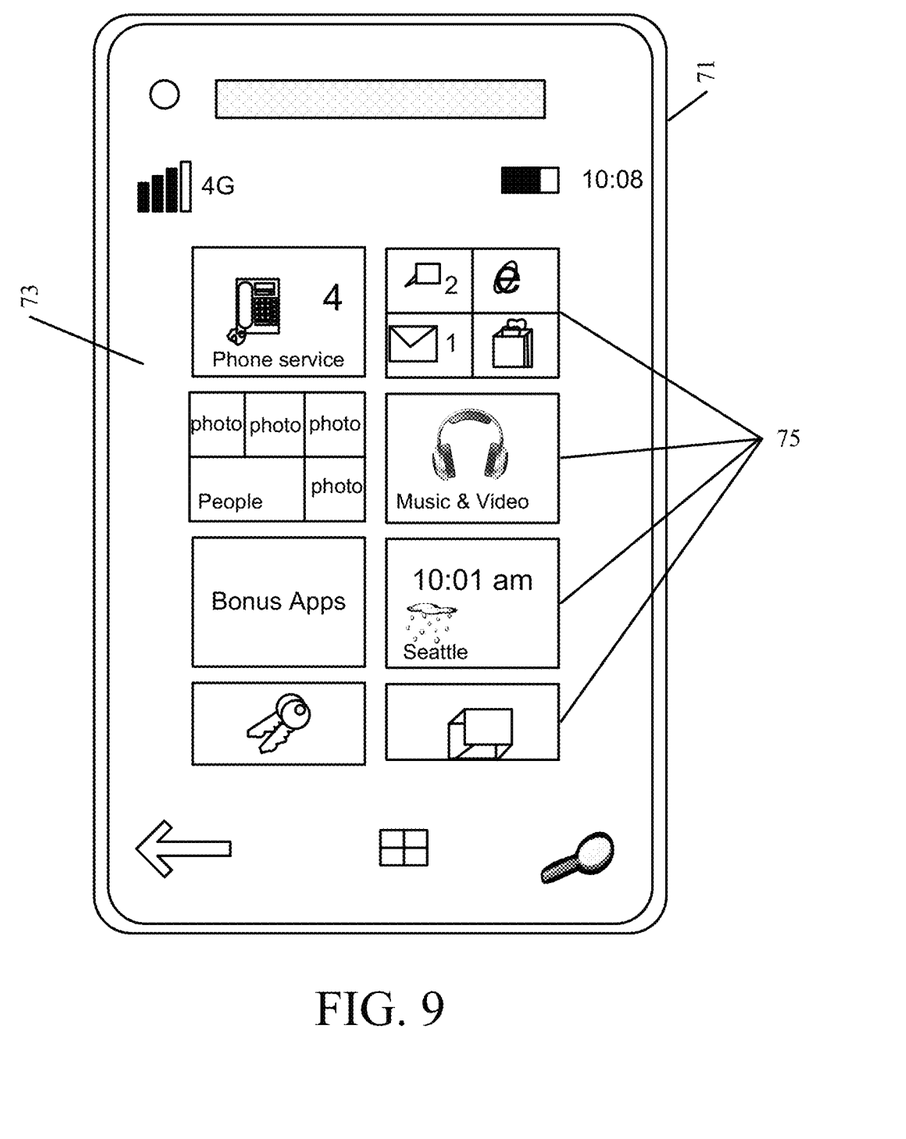

FIG. 7 is a simplified block diagram of one illustrative embodiment of a handheld or mobile computing device that can be used as a user's or client's hand held device 16, in which the present system (or parts of it) can be deployed, or which can comprise user devices 116-118. FIGS. 8-9 are examples of handheld or mobile devices.

FIG. 7 provides a general block diagram of the components of a client device 16 that can run components of architecture 100 or that interacts with architecture 100, or both. In the device 16, a communications link 13 is provided that allows the handheld device to communicate with other computing devices and under some embodiments provides a channel for receiving information automatically, such as by scanning Examples of communications link 13 include an infrared port, a serial/USB port, a cable network port such as an Ethernet port, and a wireless network port allowing communication though one or more communication protocols including General Packet Radio Service (GPRS), LTE, HSPA, HSPA+ and other 3G and 4G radio protocols, 1Xrtt, and Short Message Service, which are wireless services used to provide cellular access to a network, as well as Wi-Fi protocols, and Bluetooth protocol, which provide local wireless connections to networks.

In other examples, applications or systems are received on a removable Secure Digital (SD) card that is connected to a SD card interface 15. SD card interface 15 and communication links 13 communicate with a processor 17 (which can also embody processor 126 from FIG. 1) along a bus 19 that is also connected to memory 21 and input/output (I/O) components 23, as well as clock 25 and location system 27.

I/O components 23, in one embodiment, are provided to facilitate input and output operations. I/O components 23 for various embodiments of the device 16 can include input components such as buttons, touch sensors, multi-touch sensors, optical or video sensors, voice sensors, touch screens, proximity sensors, microphones, tilt sensors, and gravity switches and output components such as a display device, a speaker, and or a printer port. Other I/O components 23 can be used as well.

Clock 25 illustratively comprises a real time clock component that outputs a time and date. It can also, illustratively, provide timing functions for processor 17.

Location system 27 illustratively includes a component that outputs a current geographical location of device 16. This can include, for instance, a global positioning system (GPS) receiver, a LORAN system, a dead reckoning system, a cellular triangulation system, or other positioning system. It can also include, for example, mapping software or navigation software that generates desired maps, navigation routes and other geographic functions.

Memory 21 stores operating system 29, network settings 31, applications 33, application configuration settings 35, data store 37, communication drivers 39, and communication configuration settings 41. Memory 21 can include all types of tangible volatile and non-volatile computer-readable memory devices. It can also include computer storage media (described below). Memory 21 stores computer readable instructions that, when executed by processor 17, cause the processor to perform computer-implemented steps or functions according to the instructions. Processor 17 can be activated by other components to facilitate their functionality as well.

Examples of the network settings 31 include things such as proxy information, Internet connection information, and mappings. Application configuration settings 35 include settings that tailor the application for a specific enterprise or user. Communication configuration settings 41 provide parameters for communicating with other computers and include items such as GPRS parameters, SMS parameters, connection user names and passwords.

Applications 33 can be applications that have previously been stored on the device 16 or applications that are installed during use, although these can be part of operating system 29, or hosted external to device 16, as well.

FIG. 8 shows one embodiment in which device 16 is a tablet computer 600. In FIG. 8, computer 600 is shown with user interface display screen 602. Screen 602 can be a touch screen (so touch gestures from a user's finger can be used to interact with the application) or a pen-enabled interface that receives inputs from a pen or stylus. It can also use an on-screen virtual keyboard. Of course, it might also be attached to a keyboard or other user input device through a suitable attachment mechanism, such as a wireless link or USB port, for instance. Computer 600 can also illustratively receive voice inputs as well.

FIG. 9 shows that the device can be a smart phone 71. Smart phone 71 has a touch sensitive display 73 that displays icons or tiles or other user input mechanisms 75. Mechanisms 75 can be used by a user to run applications, make calls, perform data transfer operations, etc. In general, smart phone 71 is built on a mobile operating system and offers more advanced computing capability and connectivity than a feature phone.

Note that other forms of the devices 16 are possible.

Figure 10:
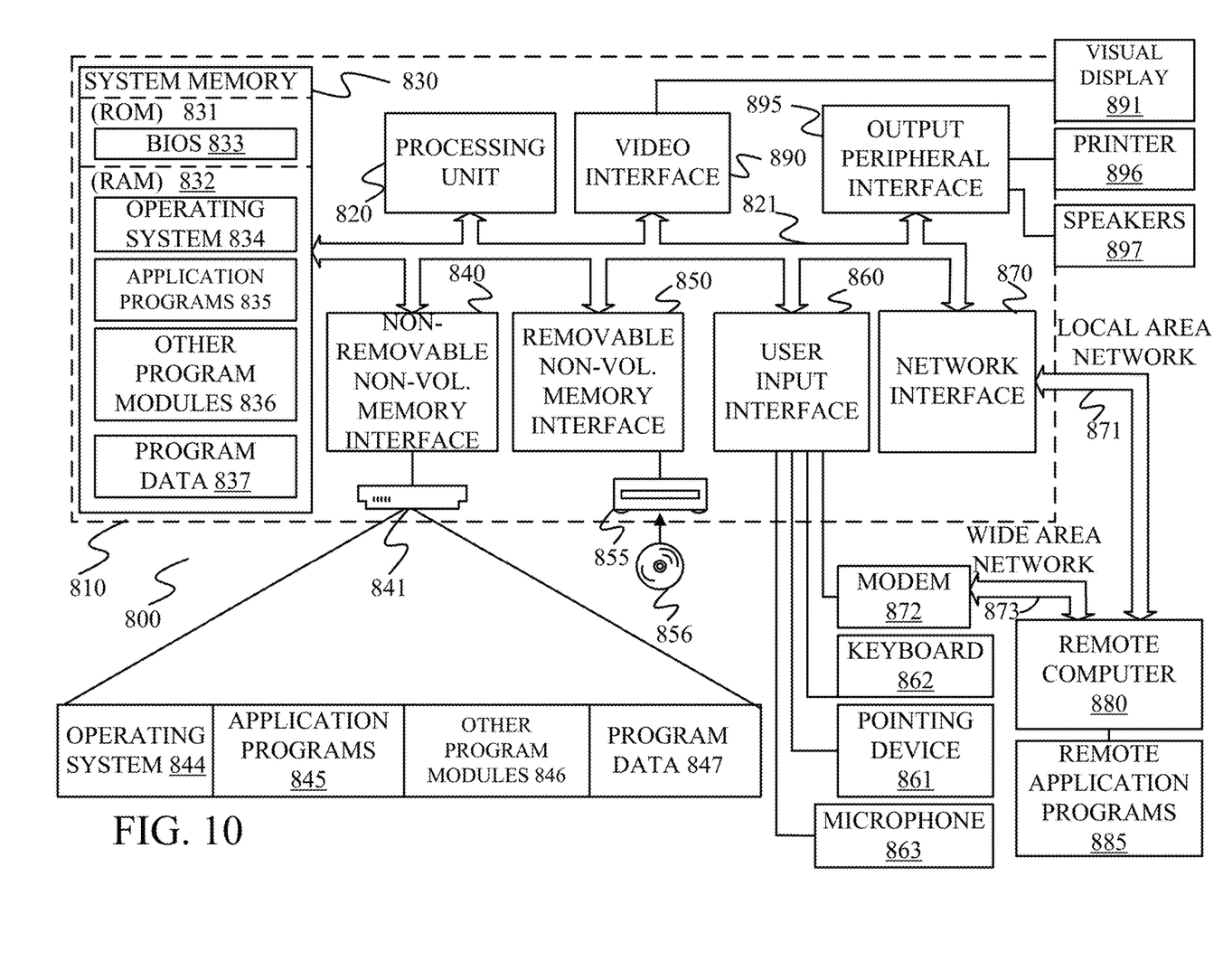
FIG. 10 is a block diagram of one illustrative computing environment that can be used in the architectures shown in previous Figures.

FIG. 10 is one example of a computing environment in which architecture 100, or parts of it, (for example) can be deployed. With reference to FIG. 10, an example system for implementing some embodiments includes a general-purpose computing device in the form of a computer 810. Components of computer 810 may include, but are not limited to, a processing unit 820 (which can comprise processor 126), a system memory 830, and a system bus 821 that couples various system components including the system memory to the processing unit 820. The system bus 821 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus. Memory and programs described with respect to FIG. 1 can be deployed in corresponding portions of FIG. 10.

Computer 810 typically includes a variety of computer readable media. Computer readable media can be any available media that can be accessed by computer 810 and includes both volatile and nonvolatile media, removable and non-removable media. By way of example, and not limitation, computer readable media may comprise computer storage media and communication media. Computer storage media is different from, and does not include, a modulated data signal or carrier wave. It includes hardware storage media including both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computer 810. Communication media typically embodies computer readable instructions, data structures, program modules or other data in a transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer readable media.

The system memory 830 includes computer storage media in the form of volatile and/or nonvolatile memory such as read only memory (ROM) 831 and random access memory (RAM) 832. A basic input/output system 833 (BIOS), containing the basic routines that help to transfer information between elements within computer 810, such as during start-up, is typically stored in ROM 831. RAM 832 typically contains data and/or program modules that are immediately accessible to and/or presently being operated on by processing unit 820. By way of example, and not limitation, FIG. 10 illustrates operating system 834, application programs 835, other program modules 836, and program data 837.

The computer 810 may also include other removable/non-removable volatile/nonvolatile computer storage media. By way of example only, FIG. 10 illustrates a hard disk drive 841 that reads from or writes to non-removable, nonvolatile magnetic media, and an optical disk drive 855 that reads from or writes to a removable, nonvolatile optical disk 856 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 841 is typically connected to the system bus 821 through a non-removable memory interface such as interface 840, and optical disk drive 855 are typically connected to the system bus 821 by a removable memory interface, such as interface 850.

Alternatively, or in addition, the functionality described herein can be performed, at least in part, by one or more hardware logic components. For example, and without limitation, illustrative types of hardware logic components that can be used include Field-programmable Gate Arrays (FPGAs), Program-specific Integrated Circuits (ASICs), Program-specific Standard Products (ASSPs), System-on-a-chip systems (SOCs), Complex Programmable Logic Devices (CPLDs), etc.

The drives and their associated computer storage media discussed above and illustrated in FIG. 10, provide storage of computer readable instructions, data structures, program modules and other data for the computer 810. In FIG. 10, for example, hard disk drive 841 is illustrated as storing operating system 844, application programs 845, other program modules 846, and program data 847. Note that these components can either be the same as or different from operating system 834, application programs 835, other program modules 836, and program data 837. Operating system 844, application programs 845, other program modules 846, and program data 847 are given different numbers here to illustrate that, at a minimum, they are different copies.

A user may enter commands and information into the computer 810 through input devices such as a keyboard 862, a microphone 863, and a pointing device 861, such as a mouse, trackball or touch pad. Other input devices (not shown) may include a joystick, game pad, satellite dish, scanner, or the like. These and other input devices are often connected to the processing unit 820 through a user input interface 860 that is coupled to the system bus, but may be connected by other interface and bus structures, such as a parallel port, game port or a universal serial bus (USB). A visual display 891 or other type of display device is also connected to the system bus 821 via an interface, such as a video interface 890. In addition to the monitor, computers may also include other peripheral output devices such as speakers 897 and printer 896, which may be connected through an output peripheral interface 895.

The computer 810 is operated in a networked environment using logical connections to one or more remote computers, such as a remote computer 880. The remote computer 880 may be a personal computer, a hand-held device, a server, a router, a network PC, a peer device or other common network node, and typically includes many or all of the elements described above relative to the computer 810. The logical connections depicted in FIG. 10 include a local area network (LAN) 871 and a wide area network (WAN) 873, but may also include other networks. Such networking environments are commonplace in offices, enterprise-wide computer networks, intranets and the Internet.

When used in a LAN networking environment, the computer 810 is connected to the LAN 871 through a network interface or adapter 870. When used in a WAN networking environment, the computer 810 typically includes a modem 872 or other means for establishing communications over the WAN 873, such as the Internet. The modem 872, which may be internal or external, may be connected to the system bus 821 via the user input interface 860, or other appropriate mechanism. In a networked environment, program modules depicted relative to the computer 810, or portions thereof, may be stored in the remote memory storage device. By way of example, and not limitation, FIG. 10 illustrates remote application programs 885 as residing on remote computer 880. It will be appreciated that the network connections shown are exemplary and other means of establishing a communications link between the computers may be used.

It should also be noted that the different embodiments described herein can be combined in different ways. That is, parts of one or more embodiments can be combined with parts of one or more other embodiments. All of this is contemplated herein.

Example 1 is a computing system, comprising:
open reply detector logic that detects opening of a user-generated reply message that is in reply to a most recent message in an electronic mail (email) thread;
new response detector logic that detects receipt of a new response message in the email thread, after opening of the user-generated reply message is detected; and
content move logic that automatically moves content of the user-generated reply message to an automatically generated reply all message that is in reply to the new response message.

Example 2 is the computing system of any or all previous examples and further comprising:
send detector logic configured to detect user actuation of a send actuator to send the user-generated reply message.

Example 3 is the computing system of any or all previous examples and further comprising:
reply all execution logic configured to execute a reply all operation to generate the automatically generated reply all message, based on the send detector logic detecting user actuation of the send actuator.

Example 4 is the computing system of any or all previous examples and further comprising:
send execution logic configured to send the automatically generated reply all message when the content move logic has moved the content of the user-generated reply message to the automatically generated reply all message.

Example 5 is the computing system of any or all previous examples wherein the content move logic comprises:
message body content move logic configured to copy message body content from the user-generated reply message to the automatically generated reply all message.

Example 6 is the computing system of any or all previous examples wherein the content move logic comprises:
attachment move logic configured to move attachments from being attached to the user-generated reply message to being attached to the automatically generated reply all message.

Example 7 is the computing system of any or all previous examples and further comprising:
new response notification logic configured to generate a user notification indicative of the new response message being detected.

Example 8 is the computing system of any or all previous examples and further comprising:
a conversation identifier system configured to group messages into the email thread.

Example 9 is the computing system of any or all previous examples wherein the conversation identifier system comprises:
a recipient set analysis component configured to group the messages into the email thread based on message recipient information.

Example 10 is the computing system of any or all previous examples wherein the conversation identifier system comprises:
a message ancestor analysis component configured to group the messages into the email thread based on message ancestor information.

Example 11 is a computer-implemented method, comprising:
detecting opening of a user-generated reply message that is in reply to a most recent message in an electronic mail (email) thread;

detecting receipt of a new response message in the email thread, after detecting opening of the user-generated reply message is detected; and automatically moving content of the user-generated reply message to an automatically generated reply all message that is in reply to the new response message.

Example 12 is the computer-implemented method of any or all previous examples and further comprising:

detecting user actuation of a send actuator to send the user-generated reply message.

Example 13 is the computer-implemented method of any or all previous examples and further comprising:

generating the automatically generated reply all message, based on the send detector logic detecting user actuation of the send actuator.

Example 14 is the computer-implemented method of any or all previous examples and further comprising:

sending the automatically generated reply all message when the content of the user-generated reply message has been moved to the automatically generated reply all message.

Example 15 is the computer-implemented method of any or all previous examples wherein automatically moving the content comprises:

copying message body content from the user-generated reply message to the automatically generated reply all message.

Example 16 is the computer-implemented method of any or all previous examples wherein automatically moving the content comprises:

moving attachments from being attached to the user-generated reply message to being attached to the automatically generated reply all message.

Example 17 is the computer-implemented method of any or all previous examples and further comprising:

generating a user notification indicative of the new response message being detected.

Example 18 is the computer-implemented method of any or all previous examples and further comprising:

grouping messages into the email thread based on message recipient information and based on message ancestor information.

Example 19 is a computing system, comprising:

open reply detector logic that detects opening of a user-generated reply message that is in reply to a most recent message in an electronic mail (email) thread;

new response detector logic that detects receipt of a new response message in the email thread, after opening of the user-generated reply message is detected;

send detector logic configured to detect user actuation of a send actuator to send the user-generated reply message;

reply all execution logic configured to execute a reply all operation to generate an automatically generated reply all message, based on the send detector logic detecting user actuation of the send actuator; and content move logic that automatically moves content of the user-generated reply message to the automatically generated reply all message that is in reply to the new response message.

Example 20 is the computing system of any or all previous examples and further comprising:

send execution logic configured to send the automatically generated reply all message when the content move logic has moved the content of the user-generated reply message to the automatically generated reply all message.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A computing system, comprising:
   a processor; and memory storing instructions executable by the processor, wherein the instructions, when executed, configure the computing system to:
   detect a request to reply to a first message in an electronic mail (email) thread;
   based on the request, open a second message, comprising a user-generated reply to the first message, in a user interface display having:
      a message generation user input mechanism configured to generate content in the second message; and
      a send actuator that is actuatable to send the second message;
   after the second message is opened in the user interface display, and before the send actuator is actuated to send the second message, detect receipt of a third message, comprising a response message that is associated with the first message in the email thread; and
   in response to detecting user actuation of the send actuator and that recipients on the third message comprise a superset of recipient on the first message, automatically perform each of:
      a reply all operation that automatically generates a fourth message that comprises a reply to the third message;
      a move operation to automatically move the generated content in the second message to the fourth message that comprises a reply to the third message; and
      a send operation to automatically send the fourth message after the generated content of the second message has been moved to the fourth message.

2. The computing system of claim 1 wherein performing the move operation comprises copying message body content from the second message to the fourth message.

3. The computing system of claim 1 wherein performing the move operation comprises moving an attachment from being attached to the second message to being attached to the fourth message.

4. The computing system of claim 1 wherein the instructions configure the computing system to: generate a user notification indicative of the third message being detected.

5. The computing system of claim 1 wherein the instructions configure the computing system to:
   group messages into the email thread based on at least one of: message recipient information, or message ancestor information.

6. The computing system of claim 1, wherein each of the reply all operation, the move operation, and the send operation are automatically performed without further user input after the user actuation of the send actuator.

7. The computing system of claim 1 wherein, the move operation is automatically performed without displaying the move operation in the user interface display.

8. A computer-implemented method, comprising:
   detecting a request to reply to a first message in an electronic mail (email) thread;
   based on the request, opening a second message, comprising a user-generated reply to the first message, in a user interface display having:
      a message generation user input mechanism configured to generate content in the second message; and a send actuator that is actuatable to send the second message;

after the second message is opened in the user interface display, and before the send actuator is actuated to send the second message, detecting receipt of a third message, comprising a response message that is associated with the first message in the email thread; and in response to detecting user actuation of the send actuator and that recipients on the third message comprise a superset of recipients on the first message, automatically executing a reply all operation that automatically generates a fourth message that comprises a reply to the third message, and    automatically moving the generated content in the second message to the fourth message that comprises a reply to the third message, and    automatically sending the fourth message to one or more recipients associated with the fourth message.

9. The computer-implemented method of claim 8 wherein automatically moving the content comprises: copying message body content from the user-generated reply message to the fourth message.

10. The computer-implemented method of claim 9 wherein automatically moving the content comprises:

moving attachments from being attached to the user-generated reply message to being attached to the fourth message.

11. The computer-implemented method of claim 8 wherein and further comprising:

generating a user notification indicative of the third message being detected.

12. The computer-implemented method of claim 8 and further comprising: grouping messages into the email thread based on message recipient information and based on message ancestor information.

13. A method performed by a computing system, the method comprising:

detecting a request to reply to a first message in an electronic mail (email) thread;

based on the request, opening a second message, comprising a user-generated reply to the first message, in a user interface display having:

a message generation user input mechanism configured to generate content in the second message; and       a send actuator that is actuatable to send the second message;

after the second message is opened in the user interface display, and before the send actuator is actuated to send the second reply message, detecting receipt of a third message, comprising a response message that is associated with the first message in the email thread; and    in response to detecting user actuation of the send actuator and that recipients on the third message comprise a superset of recipients on the first message, automatically performing each of:

a reply all operation to automatically generate a fourth message, that comprises a reply to the third message;

a move operation to automatically move the generated content in the second message to the fourth message that comprises a reply to the third message; and       a send operation to automatically send the fourth message after the generated content of the second message has been moved to the fourth message.

14. The method of claim 13, wherein each of the reply all operation, the move operation, and the send operation are automatically performed without further user input after the user actuation of the send actuator.

15. The method of claim 13, wherein the move operation, is automatically performed without displaying the move operation in the user interface display.

16. The method of claim 13, and further comprising: grouping messages into the email thread based on at least one of: message recipient information, or message ancestor information.

17. The method of claim 13, and further comprising:

generating a user notification indicative of the third message being detected.

18. The method of claim 13, wherein performing the move operation comprises at least one of: copying message body content from the second message to the fourth message, or moving an attachment from being attached to the second message to being attached to the fourth message.

\* \* \* \* \*